(12) United States Patent
Dry

(10) Patent No.: US 6,899,363 B2
(45) Date of Patent: May 31, 2005

(54) METHOD OF FORMING A VEHICLE COMPONENT

(75) Inventor: Alan G. Dry, Grosse Pointe Woods, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/368,817

(22) Filed: Feb. 19, 2003

(65) Prior Publication Data

US 2004/0178660 A1 Sep. 16, 2004

(51) Int. Cl.$^7$ .............................................. B60R 21/04
(52) U.S. Cl. .............................. 296/1.09; 296/187.05; 264/33; 264/45.1
(58) Field of Search .............................. 296/1.04, 1.09, 296/187.05, 187.02, 133.05; 280/751; 264/33, 45.1, 46.2, 46.8, 45.2

(56) References Cited

U.S. PATENT DOCUMENTS

| | | | |
|---|---|---|---|
| 3,979,487 A | * | 9/1976 | Squier et al. ............... 264/419 |
| 4,002,520 A | * | 1/1977 | Fenton ...................... 156/246 |
| 4,869,543 A | | 9/1989 | Grimes |
| 5,037,591 A | * | 8/1991 | Rohrlach et al. .......... 264/46.5 |
| 5,340,425 A | * | 8/1994 | Strapazzini ................ 156/211 |
| 5,354,397 A | * | 10/1994 | Miyake et al. ............... 156/77 |
| 5,540,581 A | | 7/1996 | Aida et al. |
| 5,626,382 A | | 5/1997 | Johnson et al. |
| 5,868,455 A | | 2/1999 | Springer et al. |
| 5,997,675 A | * | 12/1999 | Miyake et al. .............. 156/222 |
| 6,063,460 A | * | 5/2000 | Souders et al. ............... 428/31 |
| 6,070,905 A | * | 6/2000 | Renault ...................... 280/751 |
| 6,089,349 A | * | 7/2000 | Aye ............................. 181/284 |
| 6,210,613 B1 | | 4/2001 | Stein et al. |
| 6,213,538 B1 | | 4/2001 | Scheidmantel et al. |
| 6,248,205 B1 | | 6/2001 | Scheidmantel et al. |
| 6,391,232 B1 | | 5/2002 | Fritsch |
| 6,451,233 B1 | * | 9/2002 | Byma et al. ............... 264/46.4 |
| 2002/0066972 A1 | | 6/2002 | Fritsch |
| 2002/0121714 A1 | | 9/2002 | Preisler |
| 2002/0121718 A1 | | 9/2002 | Winget et al. |
| 2002/0121723 A1 | | 9/2002 | Preisler et al. |

FOREIGN PATENT DOCUMENTS

| | | | | |
|---|---|---|---|---|
| EP | 0 543 085 | | 5/1993 | |
| EP | 0 581 482 | | 2/1994 | |
| EP | 1 112 831 | | 7/2001 | |
| JP | 361069416 A | * | 4/1986 | ................ 264/45.1 |
| JP | 403169519 A | * | 7/1991 | ................ 264/45.1 |

* cited by examiner

*Primary Examiner*—D. Glenn Dayoan
*Assistant Examiner*—Greg Blankenship
(74) *Attorney, Agent, or Firm*—Bill C. Panagos

(57) ABSTRACT

A method of manufacturing a vehicle trim component assembly includes providing a first mold assembly comprising a first mold section and a second mold section. The first mold assembly defines a first cavity. A third mold section is then provided. The third mold section and the first mold section combine to define a second mold assembly. The second mold assembly defines a second cavity. A pin is provided and extends from a first mold surface of the first mold section into the first cavity and into a portion of the second cavity. A first material is introduced into the first cavity, thereby producing a first trim component portion. The pin defines a first void portion in the first trim component portion. The second mold section is then replaced with the third mold section to define the second cavity of the second mold assembly. A second material is then introduced into the second cavity, thereby producing a second trim component portion. The pin further defines a second void portion in the second trim component portion. The first trim component portion and the second trim component portion form a trim component assembly.

15 Claims, 4 Drawing Sheets

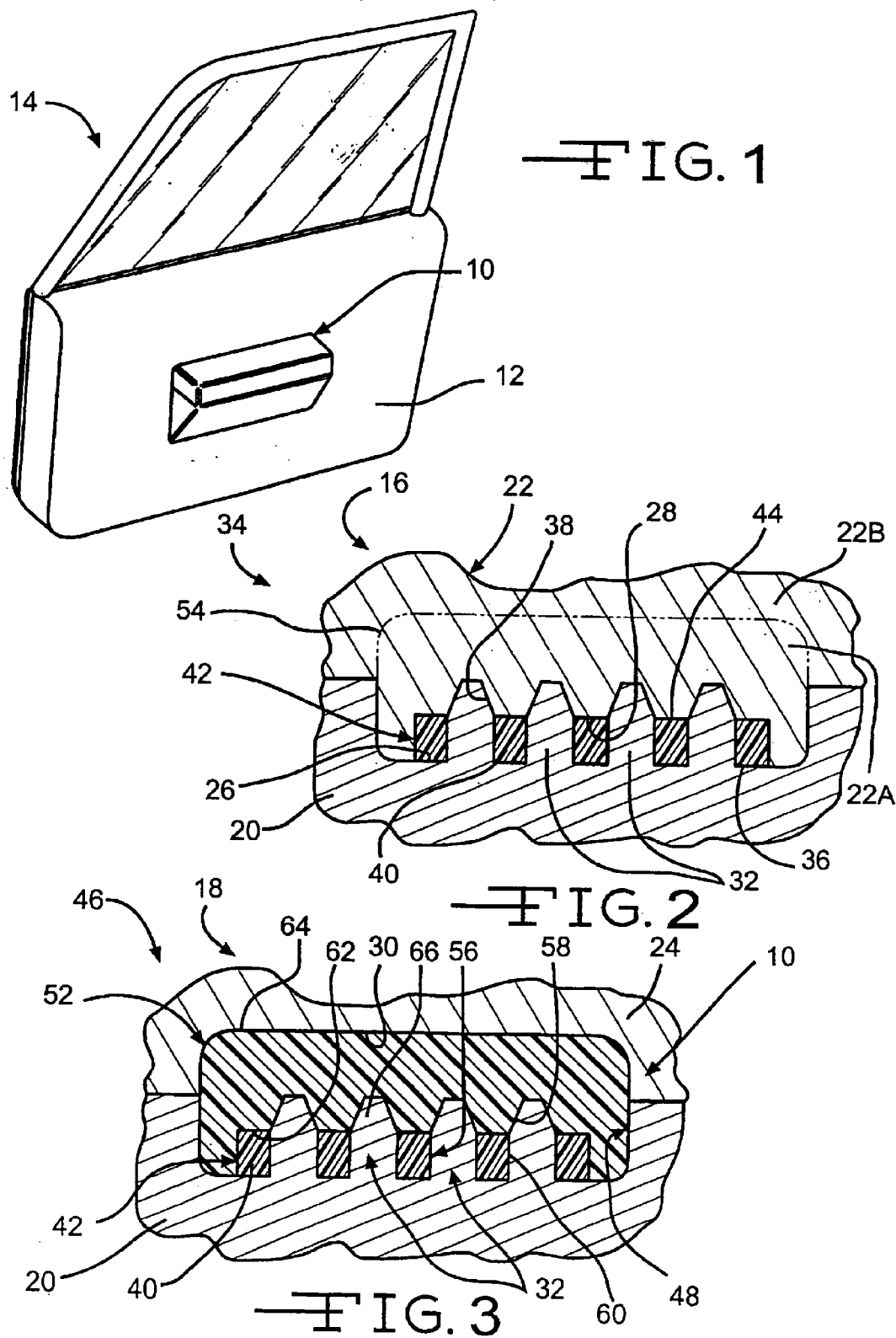

METHOD OF FORMING A VEHICLE COMPONENT

TECHNICAL FIELD

This invention relates to interior vehicle components. More particularly, the invention relates to a method of manufacturing a vehicle armrest.

BACKGROUND OF THE INVENTION

It is known to provide an interior trim panel for a vehicle, and components thereof, which is aesthetically and/or tactilely pleasing to the vehicle occupants. Such trim panels commonly have cushioned soft-touch aesthetic features. In particular, interior vehicle door panels often have localized cushioned areas in the armrest. Such localized softness may be provided by a flexible foam or elastomeric pad of varying thickness typically mounted to a rigid structural substrate and surrounded by a relatively harder durometer cover sheet.

It is also known to form vehicle armrests by placing a nibbed back surface of a molded vinyl skin against a rigid structural substrate and clamping the vinyl skin to the underside of the substrate with a closure plate. However, such known methods of manufacturing vehicle armrests typically require a series of multiple and separate molding and assembly steps which can add significant cost to each part produced. It would therefore be desirable to provide an improved method of manufacturing an armrest for a vehicle.

SUMMARY OF THE INVENTION

This invention relates to an improved method of manufacturing a manufacturing a vehicle trim component assembly. Initially, a first mold assembly is provided and comprises a first mold section and a second mold section. The first mold assembly defines a first cavity. A third mold section is then provided. The third mold section and the first mold section combine to define a second mold assembly. The second mold assembly defines a second cavity. A pin is provided and extends from a first mold surface of the first mold section into the first cavity and into a portion of the second cavity. A first material is introduced into the first cavity, thereby producing a first trim component portion. The pin defines a first void portion in the first trim component portion. The second mold section is then replaced with the third mold section to define the second cavity of the second mold assembly. A second material is then introduced into the second cavity, thereby producing a second trim component portion. The pin further defines a second void portion in the second trim component portion. The first trim component portion and the second trim component portion form a trim component assembly.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a perspective view of a vehicle door having an armrest assembly manufactured in accordance with the method of this invention.

FIG. 2 is a cross sectional elevational view of a first mold assembly used in accordance with the method of this invention, showing a substrate formed in a first cavity.

FIG. 3 is a cross sectional elevational view of a second mold assembly used in accordance with the method of this invention, showing the substrate formed in the first cavity illustrated in FIG. 2, and showing a skin formed in a second cavity.

FIG. 7 is a cross sectional elevational view of the armrest assembly taken along line 8—8 of FIG. 6.

DETAILED DESCRIPTION OF THE INVENTION

Figure 4:
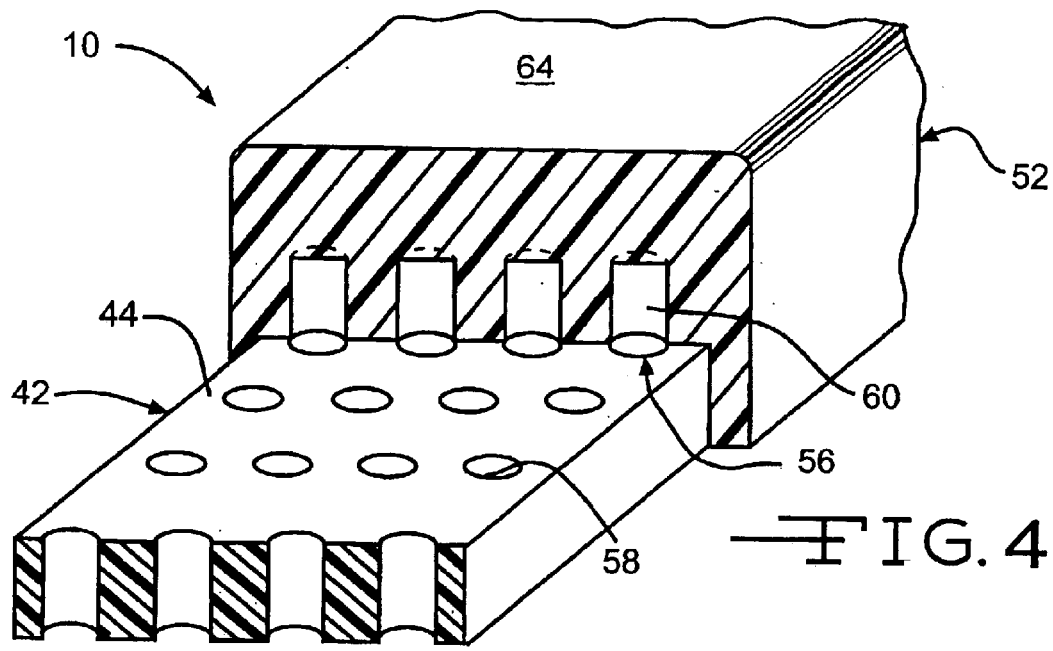
FIG. 4 is a cross sectional perspective view of the armrest assembly illustrated in FIG. 1.

Referring now to the drawings, there is illustrated in FIG. 1 a vehicle armrest assembly, generally shown at 10. In the exemplary embodiment illustrated, the armrest assembly 10 is mounted to a vehicle trim panel. The trim panel of the preferred embodiment is an automotive door trim panel 12 which mounts to a vehicle door assembly, generally shown at 14. It will be appreciated however, that the armrest 10 of the subject invention may be any desired vehicle trim component assembly. Additionally, the armrest assembly 10 may be mounted to any type of trim panel associated with a vehicle, such as center console assemblies and the like.

Referring now to FIGS. 2 and 3, there is illustrated a first mold assembly 16, and a second mold assembly 18, respectively, which are adapted to be used in accordance with the method of this invention. Preferably, the first mold assembly 16 includes a first mold section 20 and a second mold section 22, as shown in FIG. 2. The second mold assembly 18 includes the first mold section 20, and a third mold section 24, as shown in FIG. 3. The first mold section 20 includes a first mold surface 26, the second mold section 22 includes a second mold surface 28, and the third mold section 24 includes a third mold surface 30. Preferably a plurality of pins 32 extend outward of the first mold surface 26 of the first mold section 20. The structure and purpose of the pins 32 will be described in detail herein.

Although illustrated schematically in FIGS. 2 and 3, it will be appreciated that the mold surfaces 26, 28, and 30 may be of any desired shape and contour. For example, the third mold surface 30 can be textured so as to create an aesthetically and tactilely pleasing outer surface 64 of the armrest assembly 10. The mold sections 20, 22, and 24 are preferably mounted to platens (not shown) of a press (not shown), such as a vertical molding press with sufficient tonnage to accomplish the method herein described.

It will be appreciated, that in accordance with each embodiment of the invention as will be described below, a first step of the method of the invention includes providing a suitable mold assembly, and a plurality of pins.

A second step of the method of this invention is illustrated generally at 34 in FIG. 2. In the second step 34, the first mold assembly 16 is moved to a first closed position, as viewed in FIG. 2. In the first closed position, the first mold section 20 and the second mold section 22 define a first cavity 36. Preferably, the second mold surface 28 includes a plurality of pin receiving cavities 38. A first material 40 is then introduced into the first cavity 36. Any desired material can be introduced into the first cavity 36. Preferably the first material 40 is molten plastic, such as acrylonitrile butadiene styrene (ABS) or glass-filled polypropylene. The first material 40 then conforms to the shape of the first cavity 36 and the pins 32, thereby forming a first trim component portion or substrate 42. As shown in FIGS. 2 and 3, a portion of the pins 32 extend outward of an exposed surface 44 of the substrate 42, after the substrate 42 is formed. The first mold section 20 and the second mold section 22 are then moved away from one another.

A third step of the method of this invention is illustrated generally at 46 in FIG. 3. In the third step 46, the first mold section 20 and the third mold section 24 are moved into contact with one another and into a second closed position, thereby forming the second mold assembly 18. In the second closed position, the first mold section 20 and the third mold section 24 define a second cavity 48. A second material 50 is then introduced into the second cavity 48. Any desired material can be introduced into the second cavity. Preferably, the second material 50 is molten plastic, such as vinyl, or thermoplastic olefin (TPO). The second material 50 then conforms to the shape of the second cavity 48 and the pins 32, thereby forming a second trim component portion or skin 52. It will be appreciated that the first and second materials 40 and 50, respectively, may be of the same material. Preferably however, the first and second materials 40 and 50 are of different materials. More preferably, the first material 40 is relatively harder than the second material 50.

Preferably, the skin 52 becomes chemically bonded to the substrate 42 during the molding process to form the armrest assembly 10. However, such chemical bonding is not required. For example, features, such as recesses and protrusions, can be provided on the third mold surface 30 of the third mold section 24 to form corresponding recesses and protrusions in the surface 44 of the substrate 42. Such recesses and protrusion will provide a mechanical bond with the skin 52 after the molten second material hardens to form the skin 52. Alternately, holes or recesses can be formed in the substrate, such that the second material fills the recesses. The second material thereby becomes bonded to the substrate when the second material hardens within the recesses.

The third mold section 24 and the first mold section 20 are then moved away from one another and the armrest assembly 10 is removed from the second mold assembly 18. It will be appreciated that the method of the invention can be performed with satisfactory results in a shuttle-mold wherein the second and third mold sections 22 and 24 move relative to a stationary first mold section 20. The method of the invention can also be performed with satisfactory results in a shuttle-mold wherein the first mold section 20 moves relative to stationary second and third mold sections 22 and 24, or wherein all mold sections 20, 22, and 24 move relative to one another.

It will be appreciated that satisfactory results can also be achieved by using an alternate embodiment of the second mold section 22. Such an alternate embodiment of the second mold section 22 can include a second mold portion 22A, preferably nested in a third mold portion 22B as illustrated by a phantom line 54 in FIG. 2. In the first closed position, the first mold section 20 and the second mold portion 22A define the first cavity 36. After the substrate 42 is formed, the second mold portion 22A is removed, such that the third mold portion 22B defines the second cavity 48. The armrest assembly 10 is otherwise formed as herein described.

Preferably, the armrest assembly 10 is manufactured using a two-shot molding process. The two-shot molding process may be accomplished by rotating the first mold section 20, such as in a rotational molding process. In such a rotational molding process, the substrate 42 is first injection molded in the first mold assembly 16 as described herein. The first mold section 20, containing the substrate 42 is then rotated to a second position and joined with the third mold section 24 to form the second cavity 48. The skin 52 is then injection molded in the second cavity 48. Alternately, two separate molds could be used sequentially to form the substrate 42 and the skin 52.

The method of forming an armrest described herein, and the armrest formed thereby, is advantageous over prior art designs because the two-shot molding process eliminates the manual assembly required by the prior art methods. The method of the invention further improves quality, and eliminates the multiple components, such as structural members or substrates, foam inserts, outer covers or skins, closure plates, and adhesives or fasteners, of known armrest assemblies.

As best shown in FIGS. 3 and 4, the pins 32 define a plurality of voids or holes 56 in the armrest assembly 10. Preferably, a first hole portion 58 extends through the substrate 42, and into communication with a second hole portion 60 in the skin 52. The second hole portion 60 preferably extends from an inner surface 62 of the skin 52 to a point intermediate the inner surface 62 of the skin 52 and the outer surface 64 of the armrest assembly 10. The plurality of holes 56 can be arranged in any desired pattern in the armrest assembly 10. Preferably, the first hole portions 58 in the substrate 42 are vertically aligned with the second hole portions 60 in the skin 52. An exemplary pattern of holes 56 is illustrated in FIG. 4, however the armrest assembly 10 may be manufactured having any desired pattern of holes.

It will also be appreciated that the pins 32 can be movable relative to the first mold surface 26 such that the pins 32 can be moved to a first pin position within the first cavity 36, and a second pin position within the second cavity 48. Preferably, in the first pin position, the pins 32 extend into engagement with the second mold surface 28, so as to define the first hole portion 58 in the substrate 42. With such movable pins 32, the second mold surface 28 could be formed without the plurality of pin receiving cavities 38.

A variety of pin sizes, shapes, and locations can be provided so as to provide a desired appearance and feel to the outer surface 64 of the armrest assembly 10. For example, by varying the sizes, shapes, and locations of the pins 32, a manufacturer can control the relative softness of the armrest, e.g. how soft the armrest assembly 10 feels to a vehicle occupant. The pins can be substantially cylindrical, substantially cylindrical with a tapered distal end portion 66, such as the pin 32 shown in FIGS. 2 and 3, or substantially cylindrical with an distal end portion having any other desired shape. It will be appreciated that a pin having a shape, such as the tapered end portion 66, will define a shaped hole, such as the tapered hole 56 illustrated in FIGS. 3 and 4.

Figure 7:
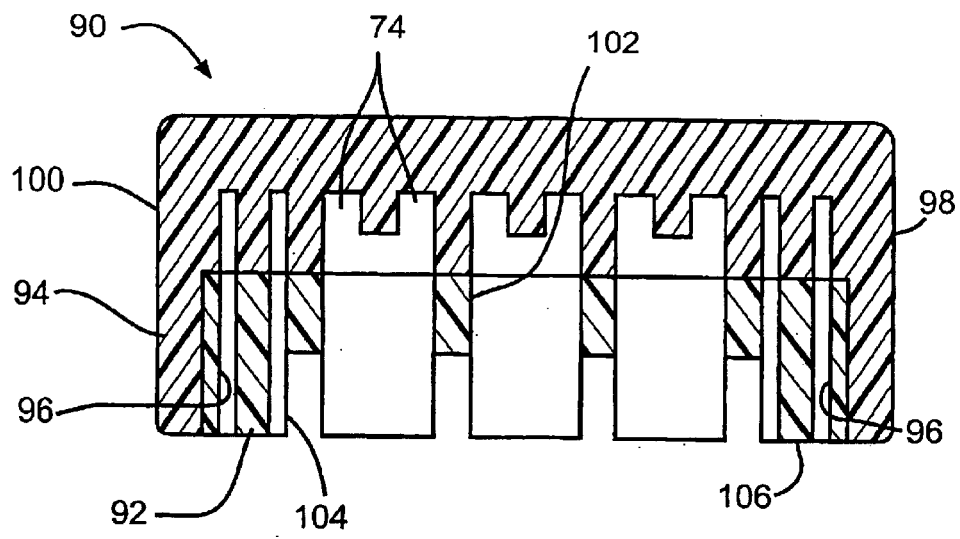
FIG. 7 is a cross sectional elevational view of the armrest assembly taken along line 7—7 of FIG. 6.
Figures 10, 11:
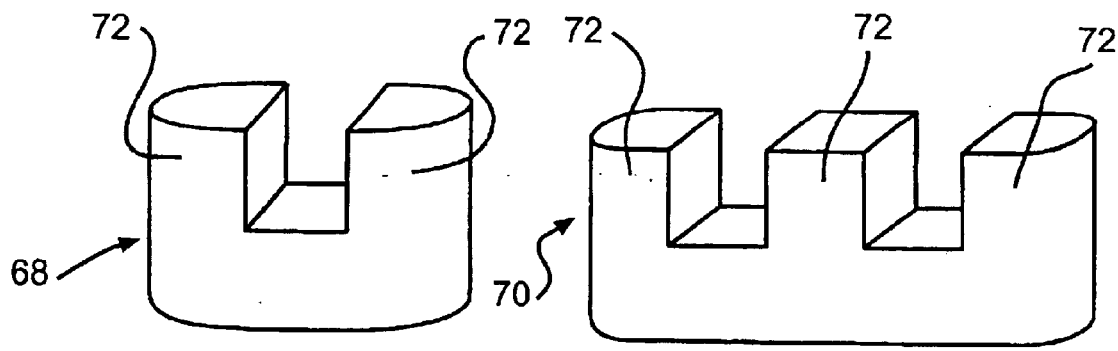
FIG. 10 is a perspective view of a castellated mold pin for a mold used in accordance with the method of the invention.
FIG. 11 is a perspective view of an alternate embodiment of a castellated mold pin for a mold used in accordance with the method of the invention.

Alternately, the pins can be substantially elongated, such as shown at 68 in FIG. 10, and at 70 in FIG. 11. Preferably, such elongated pins 68 and 70 include castellations 72 at a distal end thereof. A castellated pin, such as the pin 68, provides a plurality of void portions 74 in the skin 52, as best shown in FIG. 7. Such castellated pins 68 and 70 further allow a manufacturer to control the appearance and relative softness of the armrest assembly 10, by providing a plurality of void portions 74 on an underside of the skin 52. Such void portions 74 are smaller relative to a cross-sectional area of the elongated pins 68 and 70.

Figure 5:
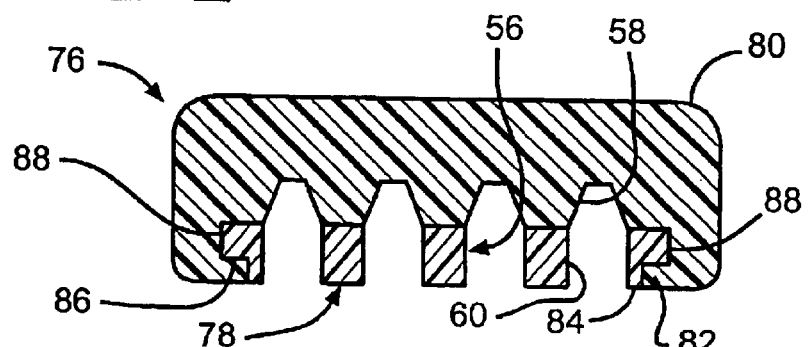
FIG. 5 is a cross sectional elevational view of an alternate embodiment of an armrest assembly formed in accordance with the method of this invention, showing the skin formed with an inwardly extending lip.

FIG. 5 illustrates a first alternate embodiment of the armrest assembly 76 manufactured in accordance with the method of the invention. The armrest assembly 76 is substantially identical to the armrest assembly 10, and includes a substrate 78 and a skin 80. However, the skin 80 of the armrest assembly 76 includes an inwardly extending lip 82 on an underside 84 of the substrate 78. Preferably, the mold assembly (not shown) for forming the substrate 78 is configured to form a void 86 in opposite side surfaces 88 of the substrate 78. When the second material 50 is introduced into the second cavity 48, the second material 50 fills the voids 86, thereby forming the inwardly extending lips 82.

Figure 6:
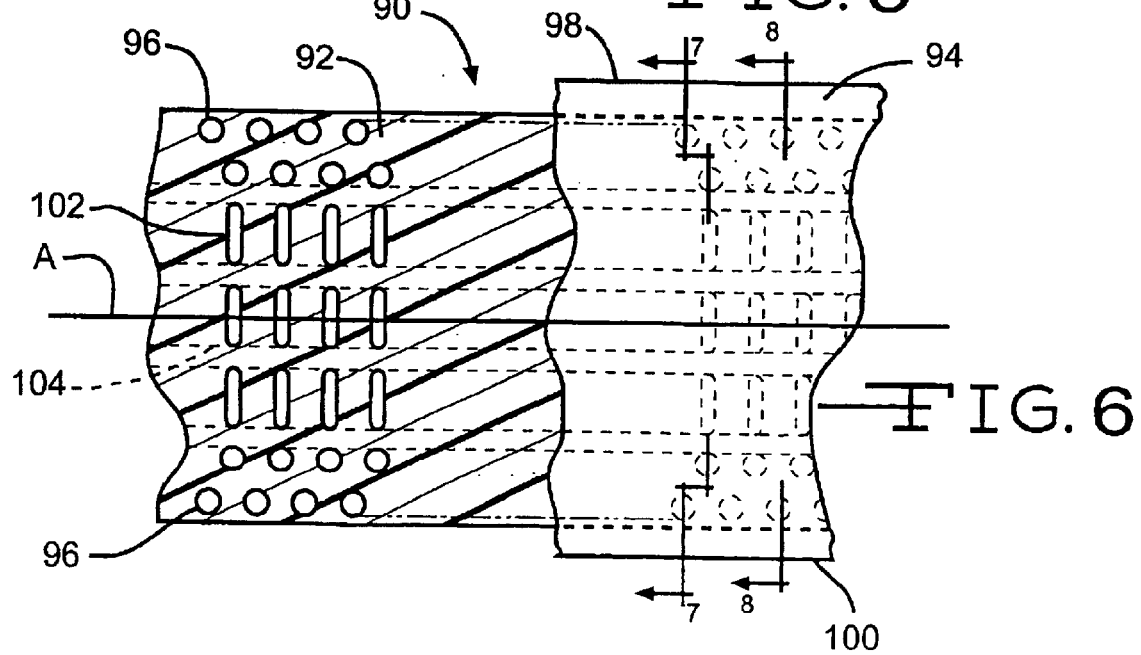
FIG. 6 is a cross-sectional plan view of an armrest assembly manufactured in accordance with the method of this invention, showing a second embodiment of the pattern of holes.
Figure 8:
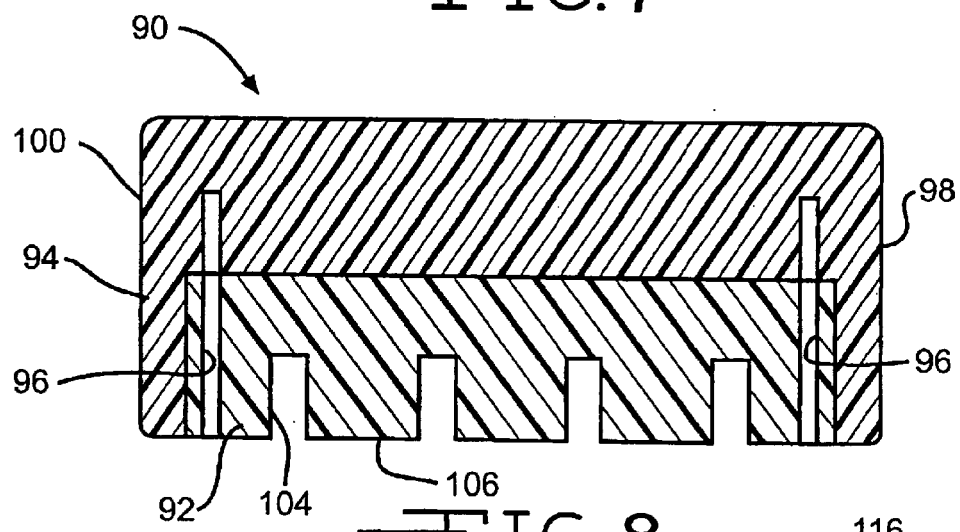

FIGS. 6 through 8 illustrate a second alternate embodiment of the armrest assembly 90 manufactured in accordance with the method of the invention. The armrest assembly 90 includes a substrate 92 and a skin 94. A plurality of substantially parallel rows of substantially cylindrical holes 96 are formed longitudinally along an inboard side 98 and an outboard side 100 of the armrest assembly 90. A plurality of substantially parallel rows of substantially elongated holes 102 are formed longitudinally intermediate the rows of holes 96. Preferably, each elongated hole 102 is oriented substantially transversely to a longitudinal axis A of the armrest assembly 90. A plurality of substantially parallel grooves 104 is formed longitudinally on an underside 106 of the substrate 92. Preferably, the grooves 104 are intermediate the rows of holes 96 and 102. The underside 106 of the substrate 92 can be formed with any desired number of grooves 104. The underside 106 can also be formed without grooves.

Figure 9:
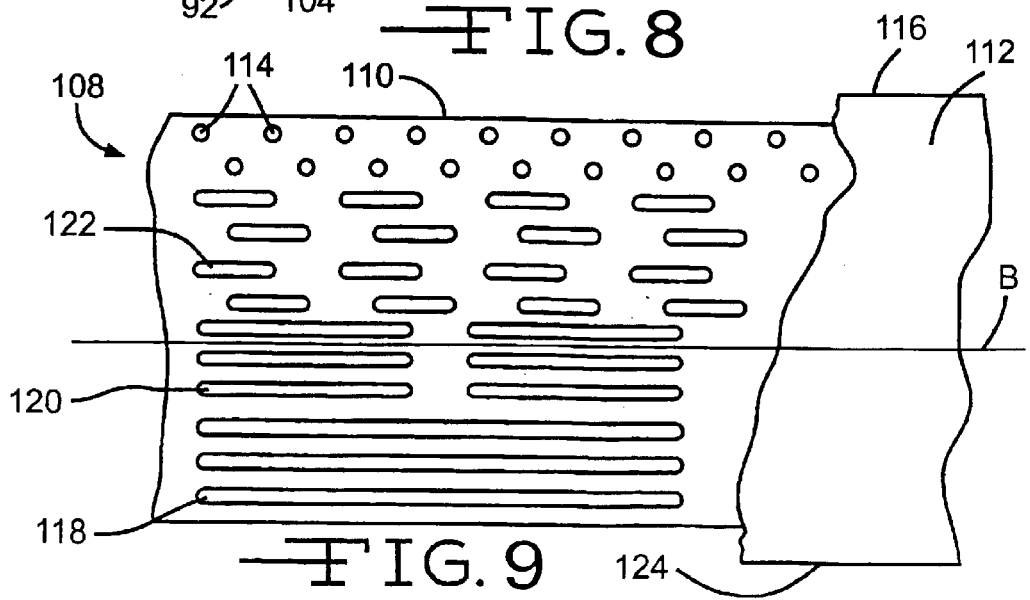
FIG. 9 is a cross-sectional plan view of an armrest assembly manufactured in accordance with the method of this invention, showing a third embodiment of the pattern of holes.

FIG. 9 illustrates a third alternate embodiment of the armrest assembly 108 manufactured in accordance with the method of the invention. The armrest assembly 108 includes a substrate 110 and a skin 112. A plurality of substantially parallel rows of substantially cylindrical holes 114 is formed longitudinally along an inboard side 116 of the armrest assembly 108. A plurality of substantially parallel rows of substantially elongated holes 118, 120, and 122 is formed longitudinally between the rows of holes 114 and an outboard side 124 of the armrest assembly 108. Preferably, the elongated holes 118 are larger relative to the adjacent elongated holes 120, and the holes 120 are larger relative to the adjacent holes 122. The holes 122 are also preferably longer than the adjacent holes 114. Each elongated hole 118, 120, and 122 is preferably oriented substantially parallel to a longitudinal axis B of the armrest assembly 108. Preferably, a plurality of pins define a gradient of voids or holes along a lateral direction, such as longitudinal axis B, such that the outboard side 124 of the armrest assembly 108 a lessor volume of the first and the second material 40 and 50, respectively, than the inboard side 116 of the armrest assembly 108.

In the embodiment illustrated in FIG. 9, three sizes of elongated holes 118, 120, and 122 are shown. However, any combination of hole sizes can be formed, such as parallel rows of holes having the same size and shape (not shown). Although not illustrated, a plurality of substantially parallel grooves, such as the grooves 104 shown in FIGS. 7 and 8, can be formed on an underside of the substrate 110.

Figure 12:
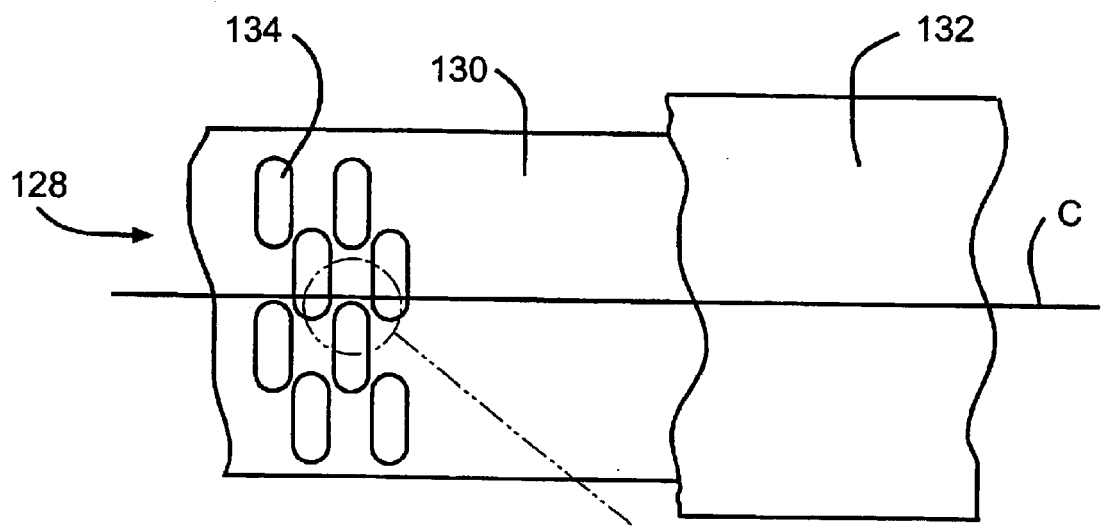
FIG. 12 is a cross-sectional plan view of an armrest assembly manufactured in accordance with the method of this invention, showing a fourth embodiment of the pattern of holes.
Figure 12A:
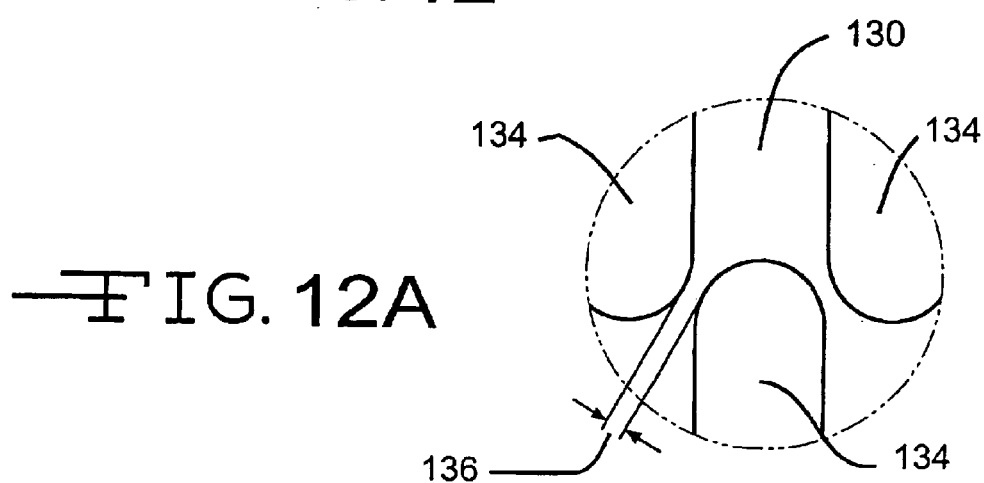

FIG. 12 illustrates a fourth alternate embodiment of the armrest assembly 128 manufactured in accordance with the method of the invention. The armrest assembly 128 includes a substrate 130 and a skin 132. A plurality of substantially parallel rows of substantially elongated holes 134 is formed longitudinally through the armrest assembly 128. Each elongated hole 134 is oriented substantially transversely to a longitudinal axis C of the armrest assembly 128. Preferably, as best shown in FIG. 12A, the holes 134 of each row are offset or staggered relative to the holes 134 of an adjacent row, such that a bridge 136 is defined therebetween. Although not illustrated, a plurality of substantially parallel grooves, such as the grooves 104 shown in FIGS. 7 and 8, can be formed on an underside of the substrate 130.

An important aspect of the method of the invention, particularly the exemplary embodiments illustrated at 90, 108, and 128 in FIGS. 6, 9, and 12, respectively, is that an armrest assembly formed as described herein is collapsible. Such a collapsible armrest assembly can substantially reduce the occurrence of injury to a vehicle occupant during a side-impact event as can occur during when one vehicle impacts another vehicle.

It has been demonstrated that an armrest assembly, such as the armrest assemblies 90, 108, and 128, formed in accordance with the method of the invention, is strong enough to support vertical loads such as can occur when a vehicle occupant stands upon the armrest assembly. Additionally, it has been demonstrated that the holes of the armrest assemblies, such as the armrest assemblies 90, 108, and 128, respectively, are arranged such that the armrest assembly will progressively collapse when the vehicle door on which the armrest assembly is installed experiences a side impact event. Preferably, such progressive collapse will occur from the outboard side of the armrest assembly toward the respective inboard side of the armrest assembly. Such collapsing of the armrest assembly thereby prevents the armrest assembly from being moved toward and into the side of a vehicle occupant, as can occur with a relatively rigid and non-collapsible known armrest assembly.

If desired, holes can be arrayed in the substrate such that collapse will occur in any desired direction or sequence. For example, the holes can be arrayed such that the armrest assembly will collapse from the inboard side of the armrest assembly toward the respective outboard side of the armrest assembly, from a center portion of the armrest assembly outwards toward the outboard side and inboard side of the armrest assembly.

It has been further demonstrated that such progressive collapse of the armrest assembly from the outboard side to the inboard side will occur under low loads relative to the load created by common vehicle side impact. Such a low load progressive collapse of the armrest assembly also substantially reduces the occurrence of injury to the vehicle occupant relative to the injury that can be caused by a relatively rigid and non-collapsible known armrest assembly.

As shown in the exemplary embodiments of the armrest assemblies as illustrated at 90, 108, and 128 in FIGS. 12 and 12A, a bridge 136 is defined between adjacent holes 134. During a side impact event, the bridges 136 will preferably collapse progressively from an outboard side 140 to an inboard side 142 of the armrest assembly 128. Such progressive breaking of the bridges 136 will ensure the progressive collapse of the armrest assembly 128.

It will be appreciated that the armrest 10 can be attached to the door trim panel 12 by any desired method. For example, threaded fasteners can be inserted through an aperture in the door trim panel 12 and into the substrate 42 of the armrest 10. Alternately, an underside of the substrate, such as the underside 84 shown in FIG. 5, can include outwardly extending bosses which define thermoplastic stakes. Such thermoplastic stakes can be extended through an aperture in the door trim panel 12. It will be appreciated that the portion of the thermoplastic stake which extends through the door trim panel 12 will be melted and reformed, so as to mechanically bond the armrest 10 to the door trim panel 12. The thermoplastic stake can be melted by any desired means, such as a heated aluminum platen (not shown).

The principle and mode of operation of this invention have been described in its preferred embodiments. However, it should be noted that this invention may be practiced otherwise than as specifically illustrated and described without departing from its scope.

What is claimed is:

1. A method of manufacturing a vehicle trim component assembly, the method comprising the steps of:
    a. providing a first mold assembly comprising a first mold section and a second mold section, the first mold assembly defining a first cavity;
    b. providing a third mold section, wherein the third mold section and the first mold section combine to define a second mold assembly, the second mold assembly defining a second cavity;
    c. providing a pin extending from a first mold surface of the first mold section into the first cavity and into a portion of the second cavity;
    d. introducing a first material into the first cavity, thereby producing a first trim component portion, the pin defining a first void portion in the first trim component portion;
    e. replacing the second mold section with the third mold section to define the second cavity of the second mold assembly; and
    f. introducing a second material into the second cavity, thereby producing a second trim component portion, wherein the pin defines a second void portion in the second trim component portion, and wherein the first trim component portion and the second trim component portion form a trim component assembly.

2. The method according to claim 1, further including a step (g) wherein the second trim component portion is chemically bonded to the first trim component portion to form a trim component assembly.

3. The method according to claim 1, further including a step (g) wherein the second trim component portion is mechanically bonded to the first trim component portion to form a trim component assembly.

4. The method according to claim 1, wherein the first material is different from the second material.

5. The method according to claim 1, wherein the pin is movable between a first position wherein the pin extends only into the first cavity and a second position wherein the pin extends into both the first cavity and a portion of the second cavity.

6. The method according to claim 1, wherein the first trim component portion has a first hardness, and the second trim component portion has a second hardness different from the first hardness.

7. The method according to claim 6, wherein the first hardness is relatively harder than the second hardness.

8. The method according to claim 1, including a plurality of pins extending from a first mold surface of the first mold section into the first cavity and into a portion of the second cavity, the pins defining a plurality of first void portions in the first trim component portion.

9. The method according to claim 8, wherein the plurality of pins includes pins having a plurality of different shapes.

10. The method according to claim 8, wherein a distal end of each of the plurality of pins includes a substantially castellated shape.

11. The method according to claim 8, wherein the pins are movable between a first position in which the pins extend only into the first cavity and a second position in which the pins extend into both the first cavity and the second cavity.

12. The method according to claim 8, wherein the plurality of pins define a gradient of voids along a lateral direction, such that an outboard side of the trim component assembly has a lessor volume of the first and the second material than an inboard side of the trim component assembly.

13. The method according to claim 8, wherein the pins are tapered from a first end to a second end, thereby forming tapered voids.

14. The method according to claim 13, wherein the tapered voids are wider at a bottom side of the trim component assembly and narrower at a top side of the trim component assembly.

15. The method according to claim 8, wherein the trim component assembly is a vehicle armrest assembly installed on a vehicle door; and
    wherein the pins form a pattern of voids, the voids at an outboard side of the armrest assembly being relatively larger than the voids at an inboard side of the armrest assembly, and arranged such that the outboard side of the armrest assembly will collapse prior to the inboard side of the armrest assembly when the vehicle door experiences a side impact on the vehicle door on which the armrest assembly is installed.

* * * * *